US012005460B2

(12) United States Patent
Rothman et al.

(10) Patent No.: US 12,005,460 B2
(45) Date of Patent: *Jun. 11, 2024

(54) UTILIZING ENGINEERED MEDIA FOR RECOVERY OF MINERALS IN TAILINGS STREAM AT THE END OF A FLOTATION SEPARATION PROCESS

(71) Applicant: CiDRA CORPOPRATE SERVICES LLC, Wallingford, CT (US)

(72) Inventors: Paul J. Rothman, Windsor, CT (US); Mark R. Fernald, Enfield, CT (US); Peter A. Amelunxen, Colebay (SX); Paul Dolan, Portland, CT (US); Timothy Bailey, Longmeadow, MA (US); Michael Ryan, Newtown, CT (US)

(73) Assignee: CIDRA CORPORATE SERVICES LLC, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,463

(22) Filed: Aug. 29, 2022

(65) Prior Publication Data

US 2023/0020934 A1 Jan. 19, 2023

Related U.S. Application Data

(62) Division of application No. 15/776,148, filed as application No. PCT/US2016/062242 on Nov. 16, 2016, now Pat. No. 11,517,918.
(Continued)

(51) Int. Cl.
*B03D 1/14* (2006.01)
*B03D 1/016* (2006.01)
(Continued)

(52) U.S. Cl.
CPC ............... *B03D 1/14* (2013.01); *B03D 1/016* (2013.01); *B03D 1/023* (2013.01); *B03D 1/082* (2013.01);
(Continued)

(58) Field of Classification Search
CPC ........ B03D 1/016; B03D 1/023; B03D 1/082; B03D 1/10; B03D 1/14; C08F 236/06; C08F 236/08
See application file for complete search history.

(56) References Cited

U.S. PATENT DOCUMENTS

| 2,854,136 A | * | 9/1958 | Gillie | ........................ B03B 5/38 209/172.5 |
| 2,877,896 A | * | 3/1959 | Jones | ........................ B03B 5/38 209/172.5 |

(Continued)

FOREIGN PATENT DOCUMENTS

| WO | 2012162612 A1 | 11/2012 |
| WO | 2013038192 A1 | 3/2013 |

(Continued)

*Primary Examiner* — Joseph C Rodriguez
(74) *Attorney, Agent, or Firm* — Ware, Fressola, Maguire & Barber LLP

(57) ABSTRACT

Apparatus uses engineered collection media to recover mineral particles in a mineral extraction process, e.g., for processing a tailings stream at the end of a flotation separation process. The engineered collection media are added to slurry/tailings containing the mineral particles. The engineered collection media have collection surfaces coated with a chemical selected for attracting the mineral particles to the collection surfaces so the engineered collection media becomes mineral laden media in the slurry/tailings in a loading stage. The apparatus include three stages: removing unwanted material from mineral laden media; using a stripping agent to strip the mineral particles from the mineral laden media; and separating the engineered collection media laden media;
(Continued)

from the mineral particles and the stripping agent. The stripping agent is reused for stripping, and the engineered collection media are returned to the loading stage. The engineered collection media can have a smooth or foam-like surface.

9 Claims, 10 Drawing Sheets

Related U.S. Application Data

(60) Provisional application No. 62/405,569, filed on Oct. 7, 2016, provisional application No. 62/276,051, filed on Jan. 7, 2016, provisional application No. 62/255,593, filed on Nov. 16, 2015.

(51) Int. Cl.
*B03D 1/02* (2006.01)
*B03D 1/08* (2006.01)
*C08F 236/06* (2006.01)
*C08F 236/08* (2006.01)
*B03D 1/004* (2006.01)

(52) U.S. Cl.
CPC .......... *C08F 236/06* (2013.01); *C08F 236/08* (2013.01); *B03D 1/0046* (2013.01); *B03D 2201/02* (2013.01); *B03D 2203/02* (2013.01)

(56) References Cited

U.S. PATENT DOCUMENTS

| | | | |
|---|---|---|---|
| 3,067,957 A * | 12/1962 | Erck | B03B 9/00 |
| | | | 241/23 |
| 3,282,675 A | 11/1966 | Parker | |
| 3,687,284 A | 8/1972 | Leeman et al. | |
| 4,339,042 A | 7/1982 | Windle | |
| 4,346,010 A * | 8/1982 | Ogino | B03B 1/04 |
| | | | 210/729 |
| 4,952,307 A | 8/1990 | Adamache | |
| 9,028,782 B2 * | 5/2015 | Senior | C22B 23/005 |
| | | | 241/24.13 |
| 11,440,026 B2 * | 9/2022 | Rothman | B03D 1/023 |
| 11,517,918 B2 * | 12/2022 | Rothman | C08F 236/08 |
| 2010/0072110 A1 * | 3/2010 | Gradek | C10G 1/047 |
| | | | 196/14.52 |
| 2010/0200510 A1 | 8/2010 | Domke et al. | |
| 2013/0004389 A1 | 1/2013 | Okamoto et al. | |
| 2013/0140218 A1 | 6/2013 | Dobby | |
| 2014/0124414 A1 | 5/2014 | Diez et al. | |
| 2014/0339172 A1 | 11/2014 | Rothman | |
| 2015/0041368 A1 | 2/2015 | Kersey | |
| 2015/0083646 A1 | 3/2015 | Didden et al. | |
| 2020/0078795 A1 | 3/2020 | Rothman | |
| 2021/0086197 A1 | 3/2021 | Rothman | |

FOREIGN PATENT DOCUMENTS

| | | |
|---|---|---|
| WO | 2015095054 A2 | 6/2015 |
| WO | 20150110555 A1 | 7/2015 |
| WO | 2017117200 A1 | 7/2017 |
| WO | 2018067649 A1 | 4/2018 |

* cited by examiner

- Media diameter - 3mm
- Media volume 300m³ cell - 7m³
- Media resistance time - 2 min
- Stripping tank vol. - ~4m³
- Clean media tank vol. - ~7m³
- Media flow rate - ~3.5m³/min
- Media S.G. -< 1.2

Media added to Existing Cell - Media S.G. less than Slurry S.G.

- Media diameter - 3mm
- Media volume 300m³ cell - 0m³
- Media volume in contact cell - 3m³
- Media volume in mixing tank - ~1.8 m³
- Media resistance time in contact cell - 1 min
- Mixing tank vol. - ~40m³
- Stripping tank vol. - ~4m³
- Clean media tank vol. - ~7m³
- Media flow rate - ~3.5m³/min
- Media S.G. -< 1.2

Contact Cell Scavanger and Media Recovery
Cell-Media S.G. less than Slurry S.G.

- Media diameter - 6mm
- Media volume 300m³ cell - 0m³
- Media volume in loading tank - 5.5m³
- Media resistance time in loading tank - 40 sec
- Loading tank vol. - ~40m³
- Stripping tank vol. - ~8m³
- Clean media tank vol. - ~14m³
- Media flow rate - ~7m³/min
- Media S.G. -> 1.2

External Loading and Trommel Recovery
Cell-Media S.G. greater than Slurry S.G.

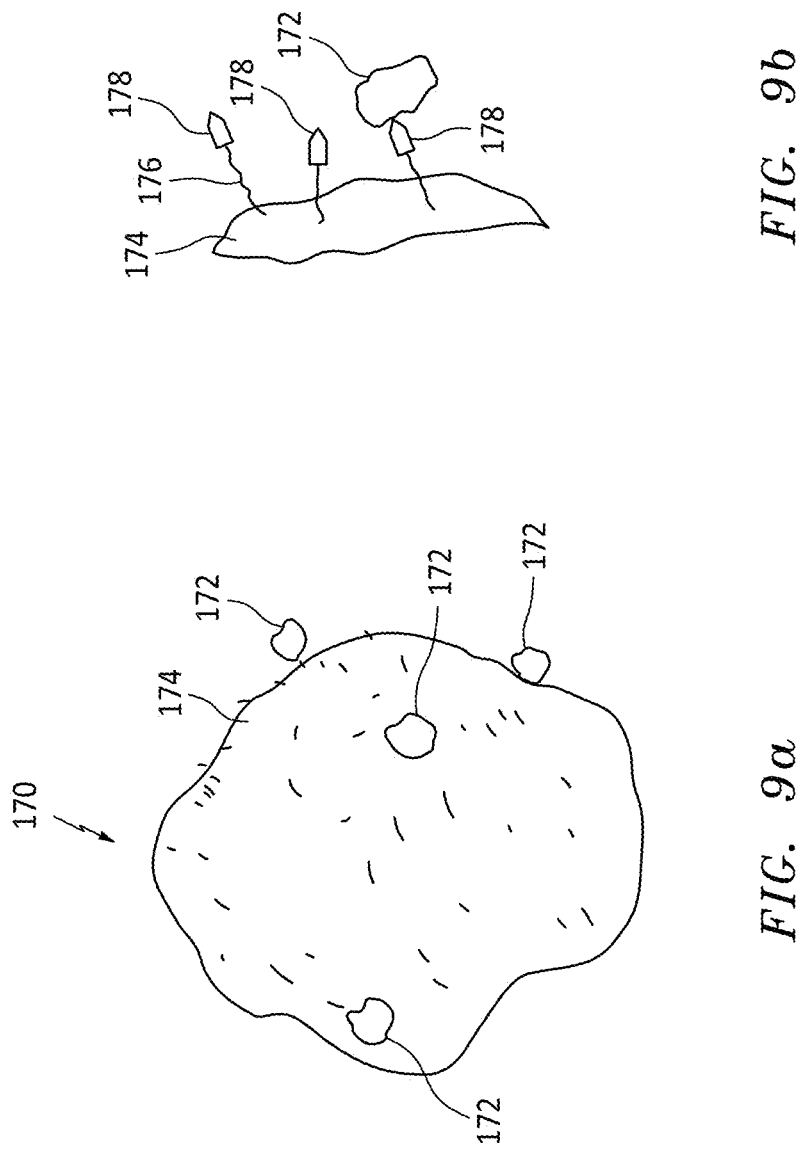

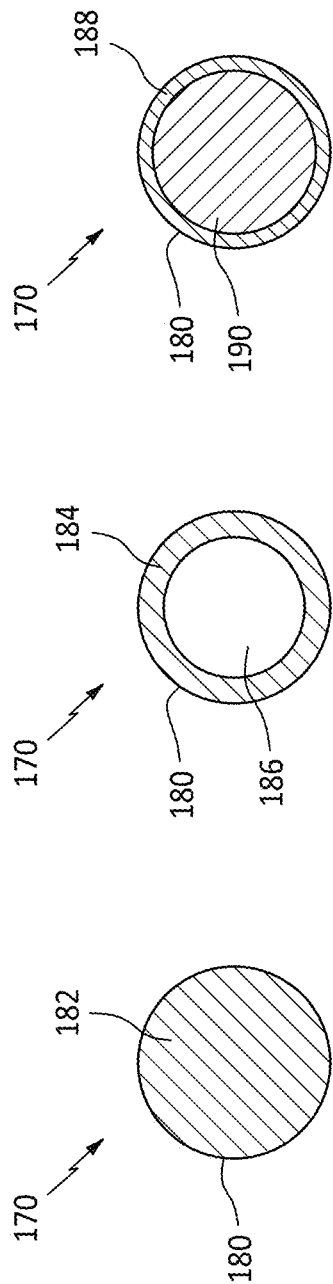
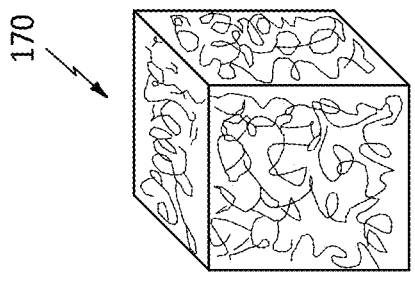
FIG. 10a
FIG. 10b
FIG. 10c
FIG. 10d
FIG. 10e

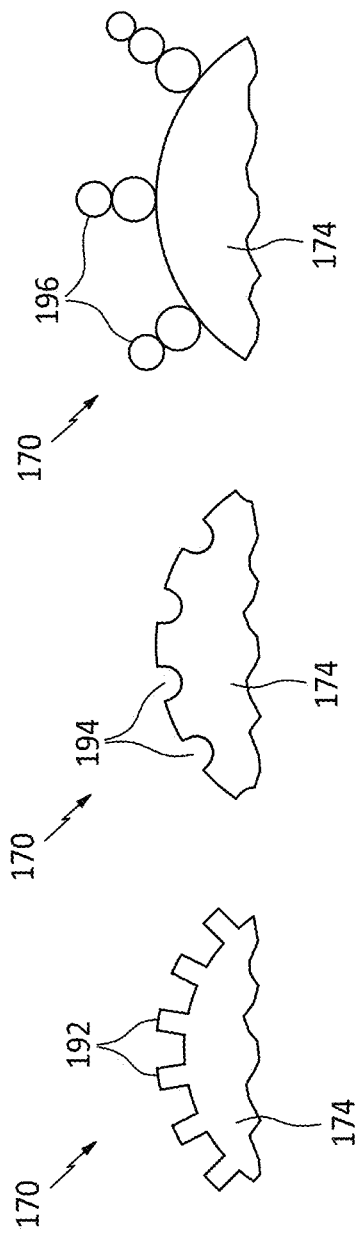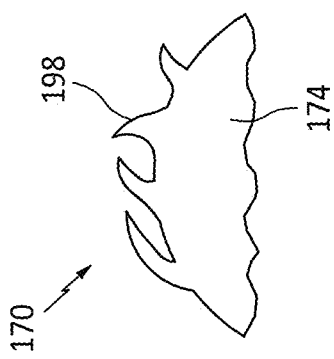

UTILIZING ENGINEERED MEDIA FOR RECOVERY OF MINERALS IN TAILINGS STREAM AT THE END OF A FLOTATION SEPARATION PROCESS

CROSS-REFERENCE TO RELATED APPLICATION

This application is a divisional of, and claims benefit to, patent application Ser. No. 15/776,148, filed 15 May 2018, which itself claims benefit to provisional patent application Ser. No. 62/255,593, filed 16 Nov. 2015, entitled "Utilizing engineered media for recovery of minerals in tailings stream at the end of a flotation separation process," provisional patent application Ser. No. 62/276,051, filed 7 Jan. 2016, entitled "Novel recovery media for mineral processing," and provisional patent application Ser. No. 62/405,569, filed 7 Oct. 2016, entitled "Three dimensional functionalized open-network structure for selective separation and mineral particles in an aqueous media," which are all hereby incorporated by reference in their entirety.

BACKGROUND OF THE INVENTION

1. Technical Field

This invention relates generally to a method and apparatus for processing mineral product for the recovery of minerals in a mineral extraction process, e.g., for processing a tailings stream in a flotation separation process.

2. Description of Related Art

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide, they become attached to each other. The bubble rises to the surface carrying the desired material with it.

The performance of the flotation cell is dependent on the air bubble surface area flux and air bubble size distribution in the collection zone of the cell. The air bubble surface area flux is dependent on the size of the bubbles and the air injection rate. Controlling the air bubble surface area flux has traditionally been very difficult. This is a multivariable control problem and there are no dependable real time feedback mechanisms to use for control.

Flotation processing techniques for the separation of materials are a widely utilized technology, particularly in the fields of minerals recovery, industrial waste water treatment, and paper recycling for example.

By way of example, in the case of minerals separation the mineral bearing ore may be crushed and ground to a size, typically around 100 microns, such that a high degree of liberation occurs between the ore minerals and the gangue (waste) material. In the case of copper mineral extraction as an example, the ground ore is then wet, suspended in a slurry, or 'pulp', and mixed with reagents such as xanthates or other reagents, which render the copper sulfide particles hydrophobic.

Froth flotation is a process widely used for separating valuable minerals from gangue. Flotation works by taking advantage of differences in the hydrophobicity of the mineral-bearing ore particles and the waste gangue. In this process, the pulp slurry of hydrophobic particles and hydrophilic particles is introduced to a water filled tank containing surfactant/frother which is aerated, creating bubbles. The hydrophobic particles attach to the air bubbles, which rise to the surface, forming a froth. The froth is removed and the concentrate is further refined.

In standard flotation separation, air is constantly forced through the pulp slurry to create a certain 'flux' of air passing through the pulp. This process, while now used widely, and refined over many decades of use, has limitations:

Due to the natural dynamics of the bubbles, a mineral-bearing particle may not typically be carried to the surface on one bubble, but may have to attach to several bubbles to reach the froth layer.

Larger particles containing minerals may not be lifted due to the limited buoyancy of a bubble, and the attractive forces between the bubble and the ore particle (created by the collector/hydrophobic chemical additives)

In general, 10% to 15% of the mineral bearing ore in the pulp is not recovered using air-based flotation processes, and consequently, new separation technologies are being explored and developed. The remaining minerals and the slurry in the flotation cell are treated as tailings to be discarded as waste. The tailings stream at the end of a flotation separation process still contains mineral particles. Nevertheless, the recovery of the minerals in the tailings using conventional methods is not cost-effective.

The present invention provide a method and apparatus for the recovery of the minerals in the tailings present in the tailings stream that circumvents the performance limiting aspects of the standard or conventional flotation process. The method and apparatus according to various embodiments of the present invention can be used to extend overall recovery of the minerals in the tailings. In particular, the method and apparatus for the recovery of minerals present in the tailings stream use engineered recovery media to attract the minerals. The engineered recovery media are also herein referred to as engineered collection media, mineral collection media, collection media or barren media. The term "engineered media" refers to synthetic bubbles or beads, typically made of a polymeric base material and coated with a hydrophobic material. According to some embodiments, and by way of example, the synthetic bubbles or beads may have a substantially spherical or cubic shape, consistent with that set forth herein, although the scope of the invention is not intended to be limited to any particular type or kind of geometric shape.

SUMMARY OF THE INVENTION

The present invention offers a solution to the above limitations of traditional mineral beneficiation. According to various embodiments of the present invention, minerals in the tailings stream, or other streams in a mineral extraction process, are recovered by applying engineered recovery media (as disclosed in commonly owned family of cases set forth below, e.g., including PCT application no. PCT/US12/39534, entitled "Mineral separation using functionalized polymer membranes") in accordance with the present invention. The process and technology of the present invention circumvents the performance limiting aspects of the standard flotation process and extends overall recovery. The engineered recovery media (also referred to as mineral collection media, collection media or barren media) obtains higher recovery performance by allowing independent optimization of key recovery attributes which is not possible with the standard air bubble in conventional flotation separation.

The present invention described three different enhanced recovery implementations. Two are based on mineral collection media formulated with an S.G. (specific gravity) less than the tailings slurry and therefore are recovered through flotation. The third method is based on mineral collection media with an S.G. greater than the tailings slurry which is recovered through screening.

The mineral recovery system of the present invention may be connected to a tailings stream of a standard flotation process. For example, the feed for the recovery system of the present invention may be connected to the tailings line from the final rougher cell of a flotation rougher row (for example a 300 m$^3$ rougher cell), or alternatively, the final rougher cell itself is used for contacting the mineral collection media with the slurry.

In the examples used to illustrate the operation of the present invention, the tailings flow rate is approximately 16,000 GPM (gallon per minute), and the expected average mineral grades in the tailing stream are 0.04% Cu and 0.011% MoS$_2$. The slurry residence time in the example 300 m$^3$ cell is approximately 5 minutes. These figures are utilized for illustrative purposes for describing an embodiment of the present invention.

The mineral recovery system, according to embodiments of the present invention, has three main stages:

1. First screening stage where a mixture containing mineral laden media (loaded media or collection media having mineral particles attached thereon) and unwanted material is sprayed with water so as to pass the unwanted material and minerals not attached to the collection media through apertures of a screen. The mixture is received from a flotation cell or a mixing stage where minerals present in the tailings are loaded on the collection media. The unwanted material may comprise non-mineral fines in a slurry or tailings.

2. The stripping stage where the spray-cleaned mineral laden media are mixed with a stripping agent and stirred or otherwise agitated so as to separate the mineral particles from the collection media on which they attached.

3. The second screening stage where the product from the stripping stage is screened in order to remove the stripping agent and to separate the collection media from the mineral particles. The second screening stage uses a screen having apertures to allow the stripping agent and the mineral particles to pass through the apertures.

In order to reduce cost and conserve processing materials, the stripping agent from the second screening stage is recirculated back to the stripping stage, and the collection media are recirculated back to a flotation cell or the mixing stage for capture mineral particles.

The mineral collection media (collection media) typically have a base material polymer such as acrylonitrile butadiene styrene (ABS) coated with a collection material, such as the collection or coated material described in commonly owned family of cases set forth below, e.g., including PCT application no. PCT/US13/42202, filed 22 May 2013, entitled "Charged engineered polymer beads/bubbles functionalized with molecules for attracting and attaching to mineral particles of interest for flotation separation." The function of the base materials is to provide the shape and S.G. of the collection media and the collection material coating serves as the mineral collection surface. In the examples of the present invention, the collection media will be spherical in shape and the diameter varies depending upon configuration. However, it is anticipated that the base material may be other materials and in other shapes, including cubes and irregular surfaces provided for increased surface area for mineral collection. Additionally, it is anticipated that the collection media may be entirely made of a collection coating material in certain applications of the present invention.

In one embodiment of the present invention, the collection media have an S.G. (specific gravity or density) less than the slurry so that the collection media float within the slurry (for example an S.G.<1.2).

In this example of the present invention, the collection media diameter could range between 0.5 mm and 3 mm, and the total collection media surface area is estimated to be approximately 14,000 m$^2$ and the volume will be a function of media diameter.

In another embodiment of the present invention, the collection media have an S.G. greater than the slurry so that the collection media sinks in the slurry (for example an S.G.>1.2) where the collection media is collected by screening of the tails.

In this example of the present invention, the possible range of diameters could be from 3 mm and 6 mm. In this case the collection media volume will represent a maximum of approximately 5% of the tailings tank volume at 6 mm diameter.

In still another embodiment of the present invention, the collection media may have multiple S.G. values, including one or both collection media with S.G. greater than or equal to the slurry S.G. and/or one or both collection media with S.G. less than or equal to the slurry S.G.

The life of the collection media will depend upon several factors, including, but not limited to, the material selected for the base, the material selected for collection surface coating, the type of minerals being collected, the removal process for the removal of minerals from the collection media, and other aspects of the handling of the collection media.

In the examples of the present invention, it is anticipated that the collection media have a useful life time of 3 months. After the useful life, the material may be recoated and reused, or it may be discarded.

In the examples of the present invention, the performance of the proposed enhanced recovery system is based on both laboratory and field test results. Initial rate testing of laboratory model system slurry (sand seeded with crushed Chalcopyrite mineral) yields a rate constant (K, in m$^{-1}$ or per minute) greater than 4. The concentrations tested are consistent with copper rougher tails stream (0.04% Cu) but have higher levels of liberation in the model system. It is expected that in an actual tailing stream, less liberation could result in a lower rate constant and lower maximum recovery because of the locking and/or occlusion of sulfide minerals.

In the example of the present invention, field trial results yielded copper recovery on the order of 10% with a maximum percentage of approximately 13%. However, it is anticipated that upon optimization of the present invention, copper recovery in range of 25% or higher is achievable on a rougher tail stream containing 0.04% Cu. These improvements would be in the area of cell kinetics, collection media shape and surface coating. Recovery may vary based on a number of factors, including the average particle size, the presence or absence of fines (non-mineral particulates) within the slurry, the concentration of various slurry components, including Cu and MoS$_2$ concentration, and other factors that vary the make-up of the tailings slurry.

In the examples of the present invention, Molybdenum (Mo) recovery from the field test is as high as 70% for rougher tail stream containing 0.011% MoS$_2$.

Mineral Removal

Minerals captured on the surface of the collection media (loaded media or mineral laden media) are removed in a stripping tank. The size of the tank is based on the time required to remove mineral and the loaded media feed rate.

In the examples of the present invention, laboratory tests have demonstrated significant mineral removal and collection from spherical loaded media in approximately 20 seconds in the presence of a surfactant solution. In the examples of the present invention, a reusable surfactant and a mixing impeller are utilized in the stripping tank for the removal of mineral particles from the loaded media. The volume of the stripping tank for this study is based on a one minute stripping time and can be a function of final media diameter, loaded media feed rate and surfactant concentration.

SUMMARY OF SOME SPECIFIC EMBODIMENTS

By way of example, the present invention may include, or take the form of, apparatus featuring a combination of a first separation device, a stripping device, a second separation device and a third separation device, consistent with that disclosed herein.

The first separation device may be configured to receive a first mixture containing mineral laden media and unwanted material and separate the mineral laden media from the unwanted material in the first mixture. The mineral laden media may include engineered collection media with a collection surface having mineral particles attached thereto.

The stripping device may be configured to receive from the first separation device the mineral laden media and to cause the mineral laden media to contact with a stripping agent. The stripping device may also be further configured to cause the mineral particles attached on the collection surface to separate from the engineered collection media.

The second separation device may be configured to receive from the stripping device a second mixture containing the stripping agent, the mineral particles and the engineered collection media, and separate the engineered collection media from the mineral particles and the stripping agent.

The third separation device may be configured to receive from the second separation device the mineral particles and the stripping agent, and separate the mineral particles from the stripping agent.

By way of example, the apparatus may include one or more of the following features:

According to some embodiments, the apparatus may take the form of, or may form part of, a mineral separation process.

According to some embodiments, the first mixture may be a tailings slurry, e.g., present in a tailings stream, and the mineral extraction process may include an enhanced recovery implementation based upon the specific gravity of the engineered collection media and the tailings slurry.

According to some embodiments, the enhanced recovery implementation may be based upon the specific gravity of the engineered collection media being less than the tailings slurry, and the engineered collection media may be processed and recovered through flotation.

According to some embodiments, the enhanced recovery implementation may be based upon the specific gravity of the engineered collection media being greater than the tailings slurry, and the engineered collection media may be processed and recovered through screening.

According to some embodiments, the mineral extraction process may include a flotation separation process; and the apparatus may be configured at the end of the flotation separation process for processing a tailings slurry.

According to some embodiments, the apparatus may also include a first recirculation device, e.g. configured to return the stripping agent obtained from the third separation device to the stripping device.

According to some embodiments, the first mixture may be received from a flotation device; and the flotation device may be configured to process a slurry containing water, the mineral laden media and the unwanted material and to provide a froth containing the first mixture. The apparatus may include a second circulation device configured to return the engineered collection media obtained from the second separation device to the flotation device.

According to some embodiments, the first mixture may be received from a contact cell; the contact cell may be configured to receive a mixed product containing the mineral laden media from a mixing device. The mixing device may be configured to receive a tails product containing the mineral particles from a flotation device, and cause the mineral particles in the tails product to contact with the engineered collection media so as to provide the mineral laden media in the mixed product. The apparatus may also include a second circulation device configured to return the engineered collection media obtained from the second separation device to the mixing device.

According to some embodiments, the first mixture may be received from a mixing device; and the mixing device may be configured to receive a tails product containing mineral particles from a flotation device, and cause the mineral particles in the tails product to contact with the engineered collection media so as to provide the mineral laden media in the first mixture. The apparatus may also include a second circulation device configured to return the engineered collection media obtained from the second separation device to the mixing device.

According to some embodiments, the first separation device may include a first screen having screen apertures; and the first screen apertures may be dimensioned to allow the unwanted material to pass through so as to separate the unwanted material from the mineral laden media. The apparatus may also include a water spraying device configured to spray water on the first mixture while the first mixture is caused to move along the first screen.

According to some embodiments, the stripping device may include a container to hold the stripping agent and the mineral laden media, and a stirring device configured to cause the mineral particles attached to the collection surface to separate from the engineered collection media.

According to some embodiments, the second separation device may include a second screen having screen apertures; and the second screen apertures may be dimensioned to allow the stripping agent and the mineral particles to pass through so as to separate the engineered collection media from the stripping agent and the mineral particles.

According to some embodiments, the second separation device may also include a filtering device configured to receive the stripping agent and the mineral particles from the second screen; and the filtering device may be further configured to separate the stripping agent from the mineral particles.

According to some embodiments, the apparatus may also include a cleaning device configured to receive from the second separation device the engineered collection media; and the cleaning device may be further configured to clean the engineered collection media before the engineered collection media are recirculated for reuse.

According to some embodiments, the stripping agent may include surfactant. According to some embodiments, the engineered collection media may include engineered beads functionalized with molecules, the molecules having a functional group configured to attract the mineral particles to the engineered beads.

According to some embodiments, the engineered beads may include synthetic bubbles or beads having a surface to provide the molecules.

According to some embodiments, the synthetic bubbles or beads may be made of a hydrophobic material having the molecules.

According to some embodiments, the surface of the synthetic bubbles or beads may include a coating having a hydrophobic chemical selected from the group consisting of polysiloxanes, poly(dimethysiloxane), hydrophobically-modified ethyl hydroxyethyl cellulose polysiloxanes, alkylsilane and fluoroalkylsilane.

According to some embodiments, the surface of the synthetic bubbles or beads may include a coating made of one or more dimethyl siloxane, dimethyl-terminated polydimethylsiloxane and dimethyl methylhydrogen siloxane.

According to some embodiments, the surface of the synthetic bubbles and beads may include a coating made of a siloxane derivative.

The synthetic bubbles or beads may be made of an open-cell foam. According to some embodiments, the synthetic bubbles or beads may have a substantially spherical shape.

According to some embodiments, the synthetic bubbles or beads may have a substantially cubic shape.

According to some embodiments, the present invention may take the form of a method featuring steps for receiving a mixture containing mineral laden media and unwanted material, the mineral laden media comprising engineered collection media with a collection surface having mineral particles attached thereto, and separating the mineral laden media from the unwanted material in the mixture; causing the mineral laden media to contact with a stripping agent so as to detach the mineral particles from the collection surface of the engineered collection media; separating in a screening stage the engineered collection media from the mineral particles and the stripping agent; and removing the stripping agent from the mineral particles. The method may also steps for implementing one or more of the other features set forth herein.

BRIEF DESCRIPTION OF THE DRAWING

FIG. 9*a* illustrates a mineral laden synthetic bead, or loaded bead.

FIG. 9*b* illustrates part of a loaded bead having molecules to attract mineral particles.

FIGS. 10*a*-10*e* illustrate an engineered bead with different shapes and structures.

FIGS. 11*a*-11*d* illustrate various surface features on an engineered bead to increase the collection area.

DETAILED DESCRIPTION OF THE INVENTION

Figure 1:
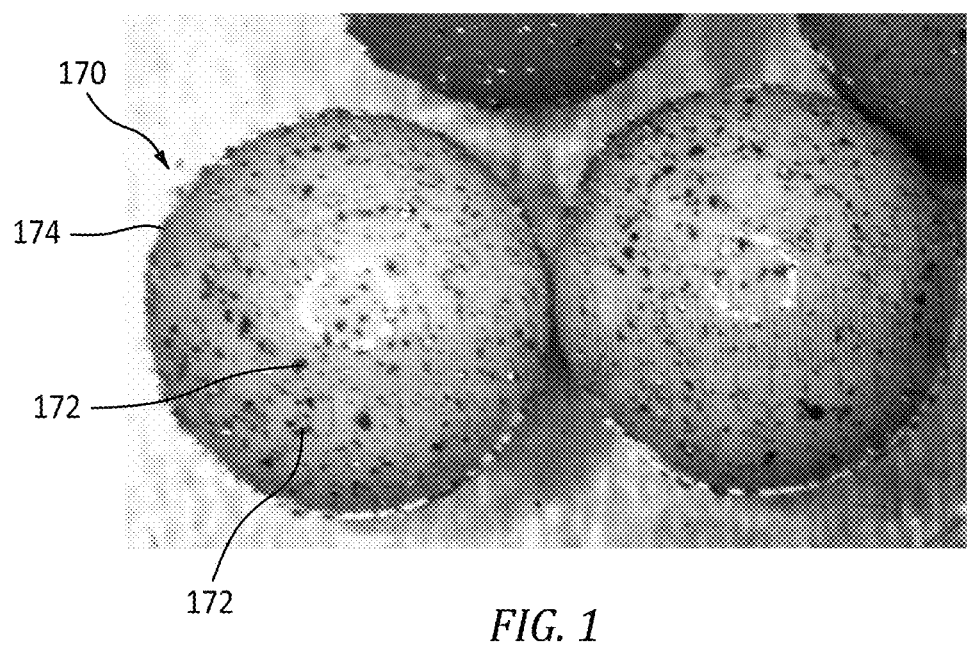
FIG. 1 is a picture of loaded media after 1 minute exposure to tailings slurry containing 0.04% Cu and 0.011% $MoS_2$.
Figure 2:
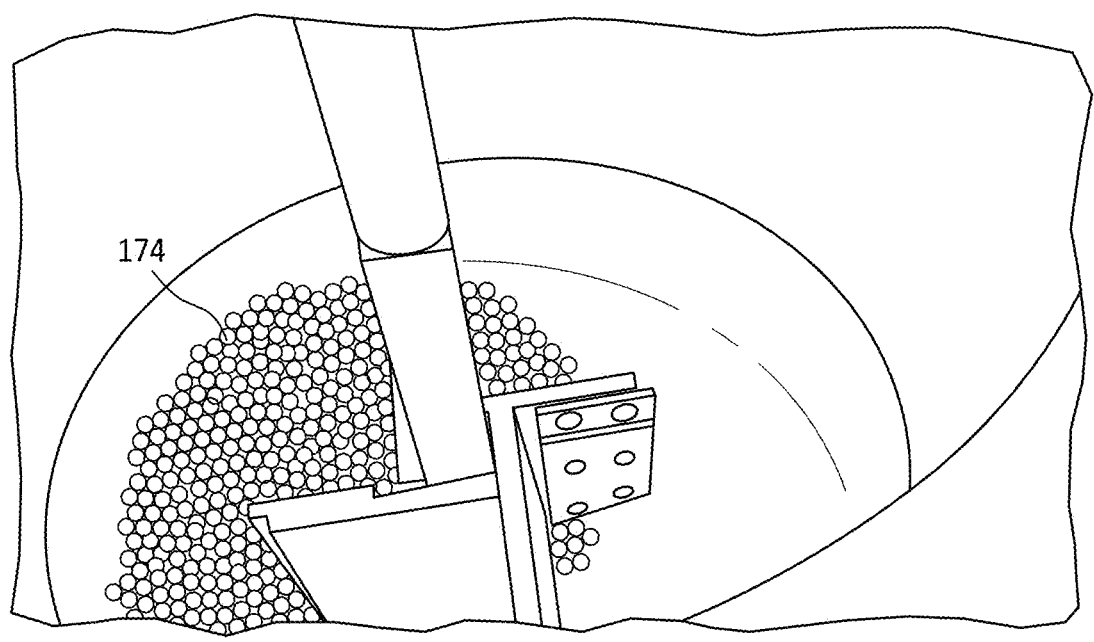
FIG. 2 is a picture showing part of a cleaning tank configured to clean the engineered collection media.
Figure 3:
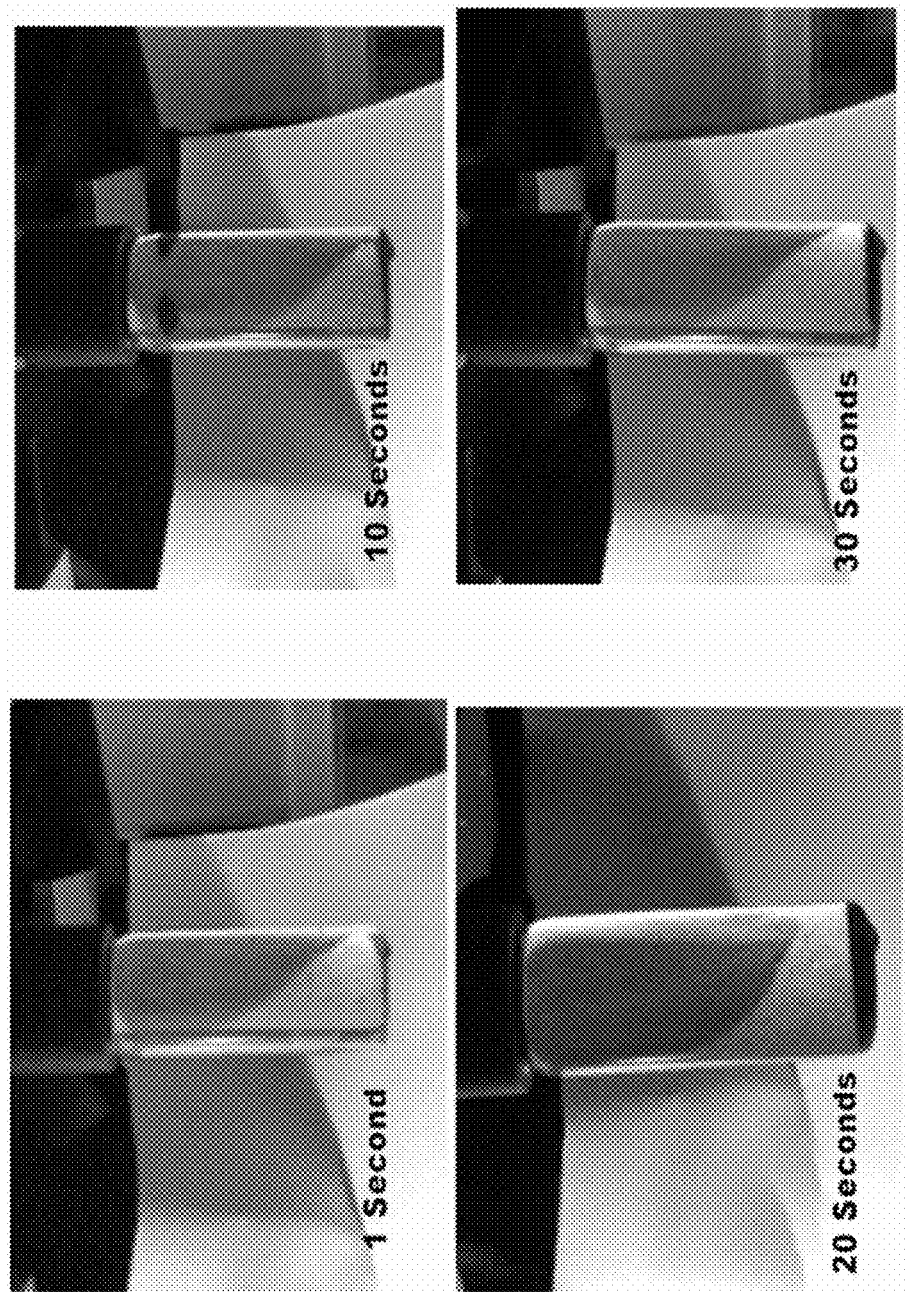
FIG. 3 shows a mineral collection jar during the recovery process.

FIGS. 1, 2 and 3

FIG. 1 is a picture of loaded media after 1 minute exposure to tailings slurry containing 0.04% Cu and 0.011% $MoS_2$. As seen in FIG. 1, each of the two loaded beads 170 has many specks of mineral particles 172 attached to an engineered bead (synthetic bead) 174. As seen in FIG. 2, synthetic beads (i.e., engineered barren media or collection media) are being cleaned in a cleaning tank (see tank 90 in FIG. 4, for example).

Figure 4:
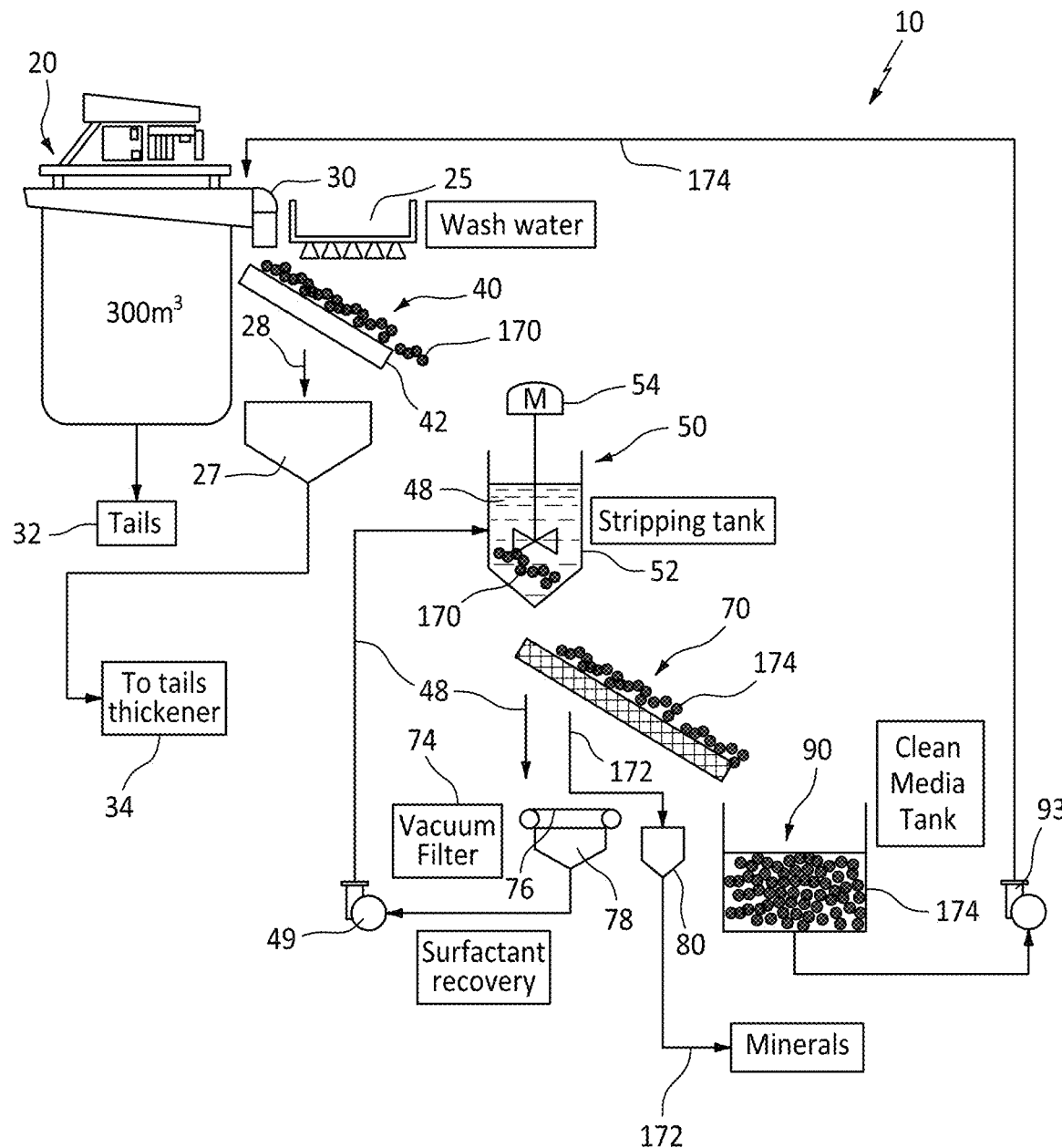
FIG. 4 shows a system for the recovery of minerals present in the tailings where the mineral laden media (loaded media) are received from a flotation cell wherein the engineered collection media are provided to a slurry to capture the minerals present in the tailings, wherein the specific gravity of the engineered collection media is smaller than that of the slurry.
Figure 5:
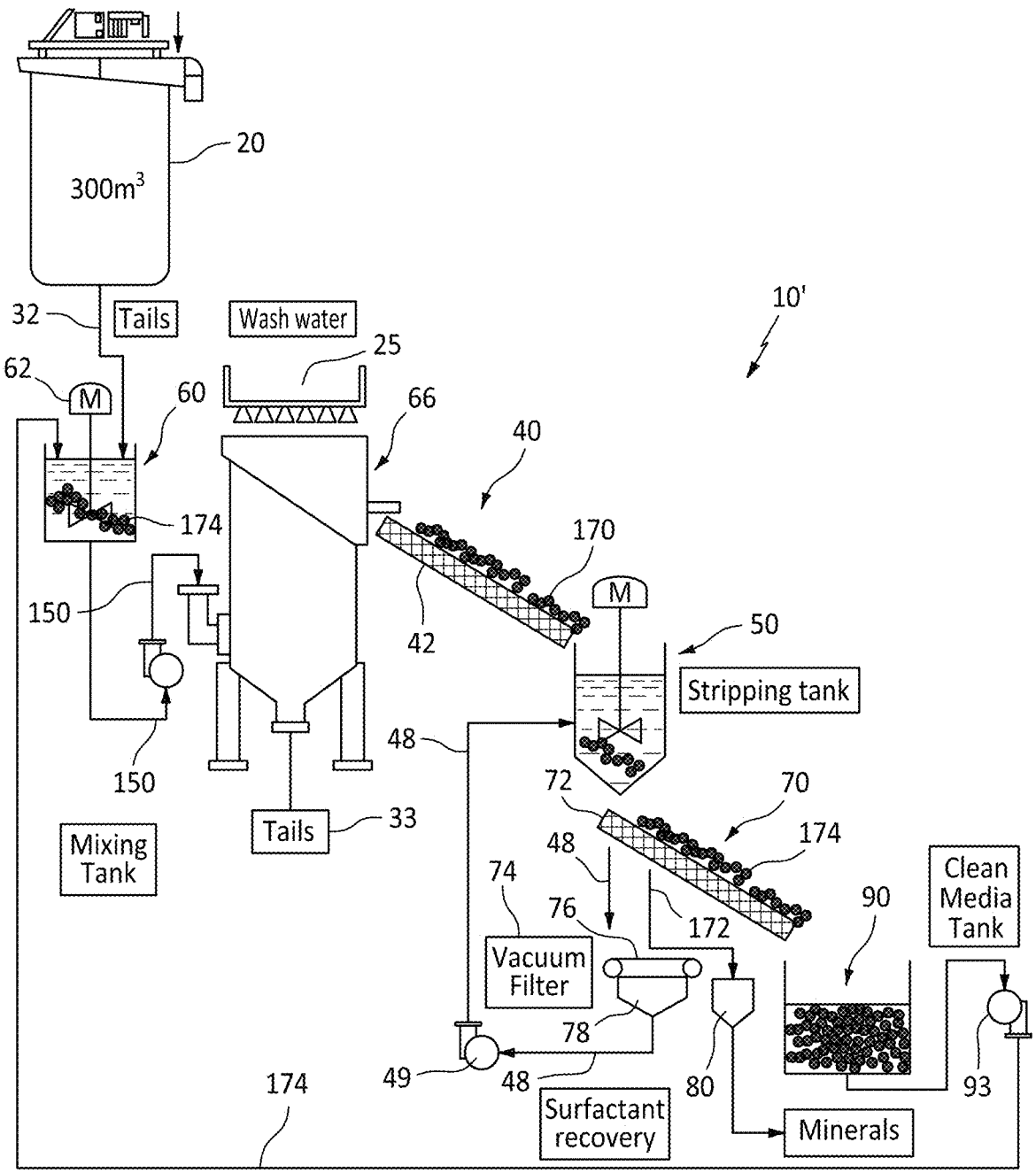
FIG. 5 shows a system for the recovery of minerals present in the tailings where the tailings containing mineral particles received from a flotation cell are mixed with engineered collection media to capture the minerals present in the tailings, wherein the specific gravity of the engineered collection medium is smaller than that of the slurry.
Figure 6:
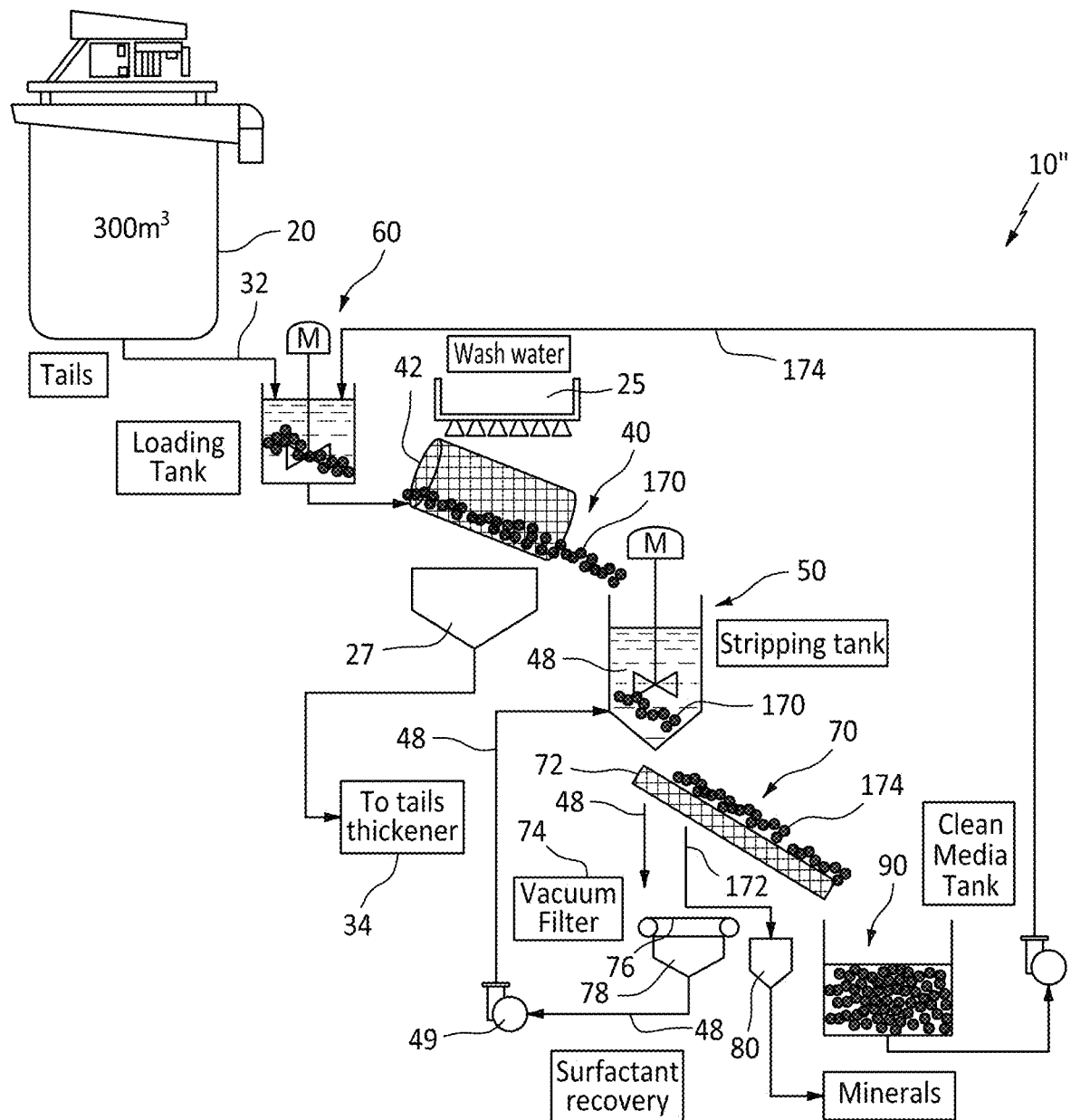
FIG. 6 shows a system for the recovery of minerals present in the tailings where the tailings containing mineral particles received from a flotation cell are mixed with engineered collection media to capture the minerals present in the tailings, wherein the specific gravity of the engineered collection medium is equal to or greater than that of the slurry.

After cleaning, the synthetic beads or barren media can be recirculated for loading in a flotation cell 20 (FIG. 4), or in a mixing tank 60 (FIGS. 5 and 6).

As seen in FIG. 3, the mineral particles 172 stripped from the loaded media 170 are collected in a jar or container 80 (see FIG. 4).

FIGS. 4, 5, 6 and 7

FIG. 4 shows a system 10 for the recovery of minerals present in the tailings where the mineral laden media 170 (loaded media) are received from a flotation cell 20.

In the flotation cell 20, engineered collection media are provided to a slurry to capture the minerals present in the tailings, wherein the specific gravity of the engineered collection media is smaller than that of the slurry. The mineral recovery system 10 has a first separation stage 40 to receive the loaded media 170 from a froth coming out of an outlet 30 of the flotation cell 20. What received from the outlet may contains loaded media 170, unwanted fines, part of the slurry with mineral particles that are not attached to the engineered collection media. The first separation stage 40 has a first screen 42 to move the loaded media 170 while wash water 25 sprays on the loaded media 170 to rid of the unwanted materials 28. The unwanted materials 28, together with the wash water, are collected in a container 27 and conveyed to a tails thickener tank 34. The loaded media 170

(see FIG. 1) are then mixed with a stripping agent 48, such as surfactant, in a stripping tank 50 where a stirrer 54 is used to agitate the loaded media 170 so as to detach the mineral particles 172 from the engineered collection media or barren media 174. At a second separation stage 70, a screen 72 is used to separate the engineered collection media 174 from the stripping agent 48 and the mineral particles 172. The engineered collection media 174 are conveyed to a cleaning tank 90 for cleaning, whereas the stripping agent 48 and the mineral particles 172 that pass through the screen 72 are provided to a separator, such as a vacuum filter 74 for separation. The vacuum filter 74 has a conveyor belt 76 made of a mesh material, for example to deliver the mineral particles 172 to a collection container or jar 80 (see FIG. 3, for example) while a suction force is used to cause the stripping agent 48 to fall into a collection container 78. A hydraulic pump 49 or the like is used to recirculate the stripping agent 48 to the stripping tank 50 for reuse. The engineered collection media 174 from the second separation stage 70 are cleaned in a cleaning tank 70 (see FIG. 2). After the cleaning, a hydraulic pump 93 or the like recirculates the clean engineered collection media 174 to the flotation cell 20 for reloading. In this mineral recovery process, the recovery system 10 can be used for mineral recovery with engineered collection media 174 having a specific gravity smaller than that of the slurry in the flotation cell 20. Engineered collection media 174 can be added to existing flotation cells to process the slurry or tailings at the end of a flotation separation process.

FIG. 5 shows a system 10' for the recovery of minerals present in the tailings. As shown in FIG. 5, the tailings 32 containing mineral particles received from a flotation cell 20 are mixed with engineered collection media 174 so as to allow the engineered collection media to capture the minerals present in the tailings, wherein the specific gravity of the collection medium is smaller than that of the slurry. The tailings 32 and the collection medium 174 are mixed in a mixing tank 60 and a stirrer 62 is used to facilitate the contact between the added engineered collection media and the mineral particles present in the tailings and to provide a product 150 containing the loaded media (mineral laden media) 170 to a contact cell scavenger 66. In this recovery system, the specific gravity of the engineered collection media 174 (and hence the loaded media 170) is smaller than that of the slurry. Thus, in the contact cell 66, the loaded media 170 are concentrated on the top part of the contact cell 66. As with the recovery system 10 as illustrated in FIG. 4, a first separation stage 40 having a screen 42 is used to remove unwanted materials from the loaded media 170, and the loaded media 170 are stripped in a stripping tank 50. The engineered collection media 174, after being cleaned in a cleaning tank 90, are returned to the mixing tank 60 for reuse.

FIG. 6 shows a system 10" for the recovery of minerals present in the tailings. The tailings 32 containing mineral particles received from a flotation cell 20 are mixed with the engineered collection media 174 so as to allow the engineered collection media 174 to capture the minerals present in the tailings, wherein the specific gravity of the collection medium is equal to or greater than that of the slurry. Because of the greater specific gravity of the engineered collection media 174, a contact cell scavenger 66 such as one shown in FIG. 5 is no longer effective in concentrating the loaded media 170 before they are sent to the first separation stage 40 for processing. As with the recovery system 10' as shown in FIGS. 4 and 5, the engineered collection media 174 are cleaned in a cleaning tank 90 after the stripping stage. After the cleaning stage, the clean the engineered collection media 174 are returned to the mixing tank 60 for loading.

Figure 7:
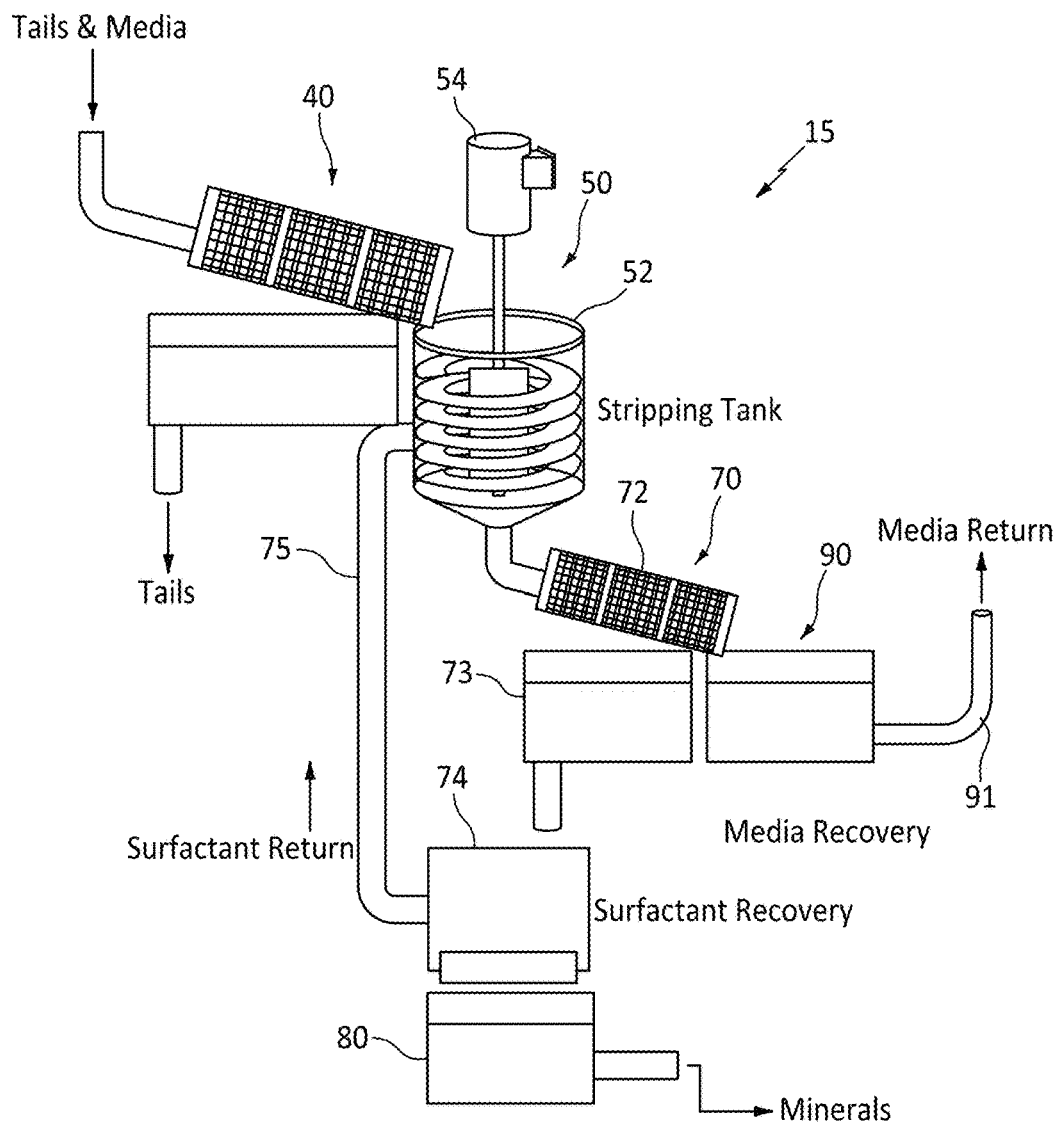
FIG. 7 shows the apparatus for mineral recovery according to an embodiment of the present invention.

FIG. 7 shows the apparatus for mineral recovery according to an embodiment of the present invention. As seen in FIG. 7, the apparatus 15 includes a first separation stage or device 40, a stripping device 50, a second separation stage or device 70. The apparatus also has a collection container 27 to collect unwanted materials and wash water, which are directed to a tailings stream; a collection device 73 to collect the stripping agent and the mineral particles from the second separation stage; a vacuum filter 74 to separate the mineral particles from the stripping agent; a conduit 75 to recirculate the stripping agent; a vacuum filter 74 to separate the stripping agent and the mineral particles; a container 80 to collect the mineral particles, a cleaning tank 90 to clean the engineered collection media; and a conduit 91 to recirculate the engineered collection media for reuse.

Figure 8:
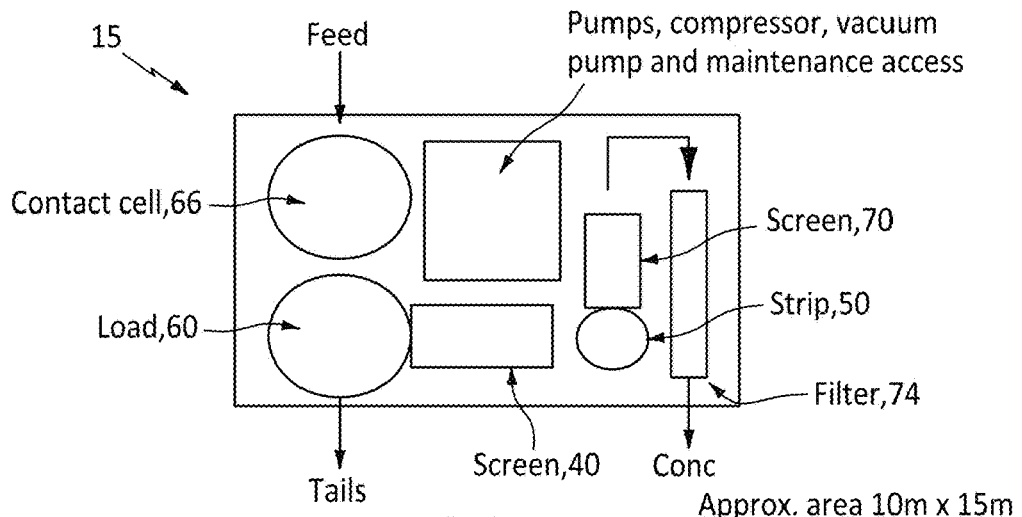
FIG. 8 illustrates how various components of the mineral recovery apparatus are organized in an area about 10 m×10 m.

FIG. 8 illustrates how various components of the mineral recovery apparatus are organized in an area about 10 m×10 m. As seen in FIG. 8, the contact cell 66 may be used to concentrate the loaded collection medium; a loading or mixing device 60 to facilitate the loading of mineral particles onto the engineered collection media; a first screen 40 as the first separation device; a stripping device 50; a second screen 70 as the second separation device; a filter 74 to separate the stripping agent from the mineral particles; and the pumps, compressors and the like for recirculating the stripping agent and the engineered collection media for reuse, driving the conveyor belt and operating the mixer, stirrer, etc. All the shown components can be organized in a small space to be used along with an existing ore operation where the tailings stream containing mineral particles can be recovered.

FIGS. 9a, 9b, 10a-10e and 11a-11b

FIG. 9a illustrates a mineral laden synthetic bead, or loaded bead 170. As illustrated, a synthetic bead 174 can attract many mineral particles 172. FIG. 9b illustrates part of a loaded bead having molecules (176, 178) to attract mineral particles.

As shown in FIGS. 9a and 9b, the synthetic bead 170 has a bead body to provide a bead surface 174. At least the outside part of the bead body is made of a synthetic material, such as polymer, so as to provide a plurality of molecules or molecular segments 176 on the surface 174. The molecule 176 is used to attach a chemical functional group 178 to the surface 174. In general, the molecule 176 can be a hydrocarbon chain, for example, and the functional group 178 can have an anionic bond for attracting or attaching a mineral, such as copper to the surface 174. A xanthate, for example, has both the functional group 178 and the molecular segment 176 to be incorporated into the polymer that is used to make the synthetic bead 170. A functional group 178 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 178 include, but are not limited to, thionocarboamates, thioureas, xanthogens, monothiophosphates, hydroquinones and polyamines. Similarly, a chelating agent can be incorporated into or onto the polymer as a collector site for attracting a mineral, such. As shown in FIG. 9b, a mineral particle 172 is attached to the functional group 178 on a molecule 176. In general, the mineral particle 172 is much smaller than the synthetic bead 170. Many mineral particles 172 can be attracted to or attached to the surface 174 of a synthetic bead 170.

In some embodiments of the present invention, a synthetic bead has a solid-phase body made of a synthetic material, such as polymer. The polymer can be rigid or elastomeric. An elastomeric polymer can be polyisoprene or polybutadiene, for example. The synthetic bead 170 has a bead body 180 having a surface comprising a plurality of molecules with one or more functional groups for attracting mineral particles to the surface. A polymer having a functional group to collect mineral particles is referred to as a functionalized polymer. In one embodiment, the entire interior part 182 of the synthetic bead 180 is made of the same functionalized material, as shown in FIG. 10a. In another embodiment, the bead body 180 comprises a shell 184. The shell 184 can be formed by way of expansion, such as thermal expansion or pressure reduction. The shell 184 can be a micro-bubble or a balloon. In FIG. 10b, the shell 184, which is made of functionalized material, has an interior part 186. The interior part 186 can be filled with air or gas to aid buoyancy, for example. The interior part 186 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 184 can be used to encapsulate a powder which can have a magnetic property so as to cause the synthetic bead to be magnetic, for example. The encapsulated liquid or powder may contain monomers, oligomers or short polymer segments for wetting the surface of mineral particles when released from the beads. For example, each of the monomers or oligomers may contain one functional group for attaching to a mineral particle and an ion for attaching the wetted mineral particle to the synthetic bead. The shell 84 can be used to encapsulate a solid core, such as Styrofoam to aid buoyancy, for example. In yet another embodiment, only the coating of the bead body is made of functionalized polymer. As shown in FIG. 10c, the synthetic bead has a core 190 made of ceramic, glass or metal and only the surface of core 190 has a coating 88 made of functionalized polymer. The core 190 can be a hollow core or a filled core depending on the application. The core 190 can be a micro-bubble, a sphere or balloon. For example, a filled core made of metal makes the density of the synthetic bead to be higher than the density of the pulp slurry, for example. The core 190 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferromagnetic or ferri-magnetic core that attract to paramagnetic surfaces. A core 90 made of glass or ceramic can be used to make the density of the synthetic bead substantially equal to the density of the pulp slurry so that when the synthetic beads are mixed into the pulp slurry for mineral collection, the beads can be in a suspension state.

According to a different embodiment of the present invention, the synthetic bead 170 can be a porous block or take the form of a sponge or foam with multiple segregated gas filled chambers as shown in FIGS. 10d and 10e. The combination of air and the synthetic beads or bubbles 170 can be added to traditional naturally aspirated flotation cell.

It should be understood that the term "bead" does not limit the shape of the synthetic bead of the present invention to be spherical, as shown in FIGS. 10a-10d. In some embodiments of the present invention, the synthetic bead 170 can have an elliptical shape, a cylindrical shape, a shape of a block. Furthermore, the synthetic bead can have an irregular shape.

It should also be understood that the surface of a synthetic bead, according to the present invention, is not limited to an overall smooth surface as shown in FIGS. 10a-10d. In some embodiments of the present invention, the surface can be irregular and rough. For example, the surface 174 can have some physical structures 192 like grooves or rods as shown in FIG. 11a. The surface 174 can have some physical structures 194 like holes or dents as shown in FIG. 11b. The surface 174 can have some physical structures 196 formed from stacked beads as shown in FIG. 11c. The surface 174 can have some hair-like physical structures 198 as shown in FIG. 11d. In addition to the functional groups on the synthetic beads that attract mineral particles to the bead surface, the physical structures can help trapping the mineral particles on the bead surface. The surface 174 can be configured to be a honeycomb surface or sponge-like surface for trapping the mineral particles and/or increasing the contacting surface.

It should also be noted that the synthetic beads of the present invention can be realized by a different way to achieve the same goal. Namely, it is possible to use a different means to attract the mineral particles to the surface of the synthetic beads. For example, the surface of the polymer beads, shells can be functionalized with a hydrophobic chemical molecule or compound. The synthetic beads and/or engineered collection media can be made of a polymer. The term "polymer" in this specification means a large molecule made of many units of the same or similar structure linked together. Furthermore, the polymer can be naturally hydrophobic or functionalized to be hydrophobic. Some polymers having a long hydrocarbon chain or silicon-oxygen backbone, for example, tend to be hydrophobic. Hydrophobic polymers include polystyrene, poly(d,l-lactide), poly(dimethylsiloxane), polypropylene, polyacrylic, polyethylene, etc. The bubbles or beads, such as synthetic bead 170 can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and beads hydrophobic. The bubbles or beads can be made of hydrophobic polymers, such as polystyrene and polypropylene to provide a hydrophobic surface. The wetted mineral particles attached to the hydrophobic synthetic bubble or beads can be released thermally, ultrasonically, electromagnetically, mechanically or in a low pH environment.

The multiplicity of hollow objects, bodies, elements or structures may include hollow cylinders or spheres, as well as capillary tubes, or some combination thereof. The scope of the invention is not intended to be limited to the type, kind or geometric shape of the hollow object, body, element or structure or the uniformity of the mixture of the same.

CCS-0175: Three Dimensional Functionalized Open-Network Structure for Selective Separation of Mineral Particles in an Aqueous System In general, the mineral processing industry has used flotation as a means of recovering valuable minerals. This process uses small air bubbles injected into a cell containing the mineral and slurry whereby the mineral attaches to the bubble and is floated to the surface. This process leads to separating the desired mineral from the gangue material. Alternatives to air bubbles have been proposed where small spheres with proprietary polymer coatings are instead used. This disclosure proposes a new and novel media type with a number of advantages.

One disadvantage of spherical shaped recovery media such as a bubble, is that it possesses a poor surface area to volume ratio. Surface area is an important property in the mineral recovery process because it defines the amount of mass that can be captured and recovered. High surface area to volume ratios allows higher recovery per unit volume of media added to a cell. As illustrated in FIG. 10e, open-cell foam and sponge-like material can be as engineered collection media. Open cell or reticulated foam offers an advantage over other media shapes such as the sphere by having higher surface area to volume ration. Applying a functionalized polymer coating that promotes attachment of mineral to the foam "network" enables higher recovery rates and improved recovery of less liberated mineral when compared to the conventional process. For example, open cells allow passage of fluid and particles smaller than the cell size but capture mineral bearing particles the come in contact with the functionalized polymer coating. Selection of cell size is dependent upon slurry properties and application.

The coated foam may be cut in a variety of shapes and forms. For example, a polymer coated foam belt can be moved through the slurry to collect the desired minerals and then cleaned to remove the collected desired minerals. The cleaned foam belt can be reintroduced into the slurry. Strips, blocks, and/or sheets of coated foam of varying size can also be used where they are randomly mixed along with the slurry in a mixing cell. The thickness and cell size of a foam can be dimensioned to be used as a cartridge-like filter which can be removed, cleaned of recovered mineral, and reused.

As mentioned earlier, the open cell or reticulated foam, when coated or soaked with hydrophobic chemical, offers an advantage over other media shapes such as sphere by having higher surface area to volume ratio. Surface area is an important property in the mineral recovery process because it defines the amount of mass that can be captured and recovered. High surface area to volume ratios allows higher recovery per unit volume of media added to a cell.

The open cell or reticulated foam provides functionalized three dimensional open network structures having high surface area with extensive interior surfaces and tortuous paths protected from abrasion and premature release of attached mineral particles. This provides for enhanced collection and increased functional durability.

Spherical shaped recovery media, such as beads, and also of belts, and filters, is poor surface area to volume ratio— these media do not provide high surface area for maximum collection of mineral. Furthermore, certain media such as beads, belts and filters may be subject to rapid degradation of functionality.

Applying a functionalized polymer coating that promotes attachment of mineral to the foam "network" enables higher recovery rates and improved recovery of less liberated mineral when compared to the conventional process. This foam is open cell so it allows passage of fluid and particles smaller than the cell size but captures mineral bearing particles the come in contact with the functionalized polymer coating. Selection of cell size is dependent upon slurry properties and application.

A three-dimensional open cellular structure optimized to provide a compliant, tacky surface of low energy enhances collection of hydrophobic or hydrophobized mineral particles ranging widely in particle size. This structure may be comprised of open-cell foam coated with a compliant, tacky polymer of low surface energy. The foam may be comprised of reticulated polyurethane or another appropriate open-cell foam material such as silicone, polychloroprene, polyisocyanurate, polystyrene, polyolefin, polyvinylchloride, epoxy, latex, fluoropolymer, phenolic, EPDM, nitrile, composite foams and such. The coating may be a polysiloxane derivative such as polydimethylsiloxane and may be modified with tackifiers, plasticizers, crosslinking agents, chain transfer agents, chain extenders, adhesion promoters, aryl or alky copolymers, fluorinated copolymers, hydrophobizing agents such as hexamethyldisilazane, and/or inorganic particles such as silica or hydrophobic silica. Alternatively, the coating may be comprised of materials typically known as pressure sensitive adhesives, e.g. acrylics, butyl rubber, ethylene vinyl acetate, natural rubber, nitriles; styrene block copolymers with ethylene, propylene, and isoprene; polyurethanes, and polyvinyl ethers as long as they are formulated to be compliant and tacky with low surface energy.

The three-dimensional open cellular structure may be coated with a primer or other adhesion agent to promote adhesion of the outer collection coating to the underlying structure.

In addition to soft polymeric foams, other three-dimensional open cellular structures such as hard plastics, ceramics, carbon fiber, and metals may be used. Examples include Incofoam®, Duocel®, metal and ceramic foams produced by American Elements®, and porous hard plastics such as polypropylene honeycombs and such. These structures must be similarly optimized to provide a compliant, tacky surface of low energy by coating as above.

The three-dimensional, open cellular structures above may be coated or may be directly reacted to form a compliant, tacky surface of low energy.

The three-dimensional, open cellular structure may itself form a compliant, tacky surface of low energy by, for example, forming such a structure directly from the coating polymers as described above. This is accomplished through methods of forming open-cell polymeric foams known to the art.

The structure may be in the form of sheets, cubes, spheres, or other shapes as well as densities (described by pores per inch and pore size distribution), and levels of tortuosity that optimize surface access, surface area, mineral attachment/detachment kinetics, and durability. These structures may be additionally optimized to target certain mineral particle size ranges, with denser structures acquiring smaller particle sizes. In general, cellular densities may range from 10-200 pores per inch, more preferably 30-90 pores per inch, and most preferably 30-60 pores per inch.

Figure 12:
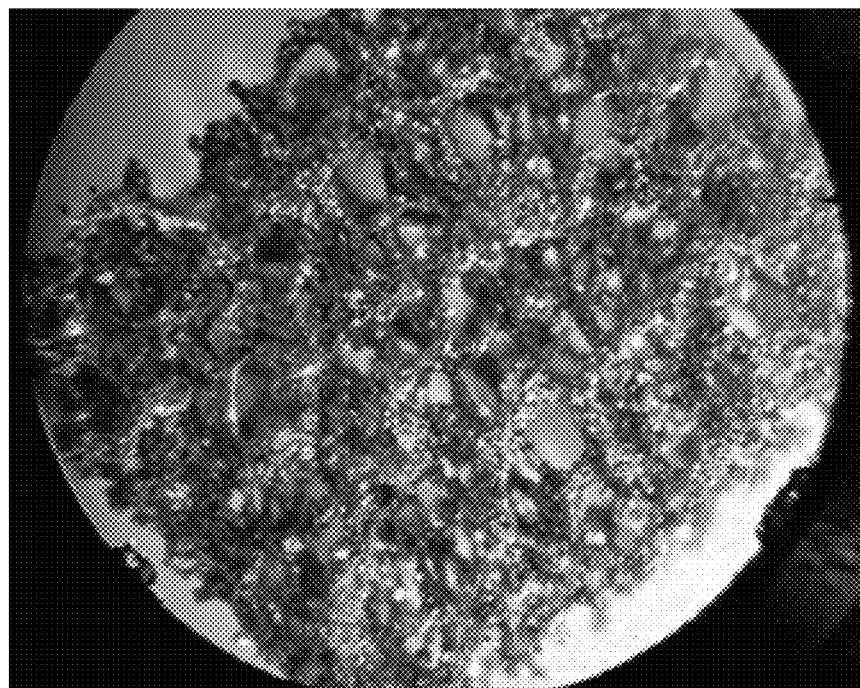
FIG. 12 shows a picture of reticulated form with Cu mineral entrained throughout the structure.

The specific shape or form of the structure may be selected for optimum performance for a specific application. For example, the structure (coated foam for example) may be cut in a variety of shapes and forms. For example, a polymer coated foam belt could be moved through the slurry removing the desired mineral whereby it is cleaned and reintroduced into the slurry. Strips, blocks, and/or sheets of coated foam of varying size could also be used where they are randomly mixed along with the slurry in a mixing cell. Alternatively, a conveyor structure may be formed where the foam is encased in a cage structure that allows a mineral-containing slurry to pass through the cage structure to be introduced to the underlying foam structure where the mineral can react with the foam and thereafter be further processed in accordance with the present invention. The thickness and cell size could be changed to a form cartridge like filter whereby the filter is removed, cleaned of recovered mineral, and reused. FIG. 1.0 is an example a section of polymer coated reticulated foam that was used to recovery Chalcopyrite mineral. Mineral particles captured from copper ore slurry can be seen throughout the foam network. FIG. 12 is an example a section of polymer coated reticulated form used for recovery of Chalcopyrite, wherein mineral particles captured copper ore slurry can be seen throughout the foam network.

There are numerous characteristics of the foam that may be important and should be considered:

Mechanical durability: Ideally, the foam will be durable in the mineral separation process. For example, a life of over 30,000 cycles in a plant system would be beneficial. As discussed above, there are numerous foam structures that can provide the desired durability, including polyester urethanes, reinforced urethanes, more durable shapes (spheres & cylinders), composites like PVC coated PU, and non-urethanes. Other potential mechanically durable foam candidate includes metal, ceramic, and carbon fiber foams and hard, porous plastics.

Chemical durability: The mineral separation process can involve a high pH environment (up to 12.5), aqueous, and abrasive. Urethanes are subject to hydrolytic degradation, especially at pH extremes. While the functionalized polymer coating provides protection for the underlying foam, ideally, the foam carrier system is resistant to the chemical environment in the event that it is exposed.

Adhesion to the coating: If the foam surface energy is too low, adhesion of the functionalized polymer coating to the foam will be very difficult and it could abrade off. However, as discussed above, a low surface energy foam may be primed with a high energy primer prior to application of the functionalized polymer coating to improve adhesion of the coating to the foam carrier. Alternatively, the surface of the foam carrier may be chemically abraded to provide "grip points" on the surface for retention of the polymer coating, or a higher surface energy foam material may be utilized. Also, the functionalized polymer coating may be modified to improve its adherence to a lower surface energy foam. Alternatively, the functionalized polymer coating could be made to covalently bond to the foam.

Surface area: Higher surface area provides more sites for the mineral to bond to the functionalized polymer coating carried by the foam substrate. There is a tradeoff between larger surface area (for example using small pore cell foam) and ability of the coated foam structure to capture mineral while allowing gangue material to pass through and not be capture, for example due to a small cell size that would effectively entrap gangue material. The foam size is selected to optimize capture of the desired mineral and minimize mechanical entrainment of undesired gangue material.

Cell size distribution: Cell diameter needs to be large enough to allow gangue and mineral to be removed but small enough to provide high surface area. There should be an optimal cell diameter distribution for the capture and removal of specific mineral particle sizes.

Tortuosity: Cells that are perfectly straight cylinders have very low tortuosity. Cells that twist and turn throughout the foam have "tortuous paths" and yield foam of high tortuosity. The degree of tortuosity may be selected to optimize the potential interaction of a mineral particle with a coated section of the foam substrate, while not be too tortuous that undesirable gangue material in entrapped by the foam substrate.

Functionalized foam: It may be possible to covalently bond functional chemical groups to the foam surface. This could include covalently bonding the functionalized polymer coating to the foam or bonding small molecules to functional groups on the surface of the foam, thereby making the mineral-adhering functionality more durable.

The pore size (PPI—pores per inch) of the foam is an important characteristic which can be leveraged to improved mineral recovery and/or target a specific size range of mineral. As the PPI increases the specific surface area (SSA) of the foam also increases. A high SSA presented to the process increases the probability of particle contact which results in a decrease in required residence time. This in turn, can lead to smaller size reactors. At the same time, higher PPI foam acts as a filter due to the smaller pore size and allows only particles smaller than the pores to enter into its core.

This enables the ability to target, for example, mineral fines over coarse particles or opens the possibility of blending a combination of different PPI foam to optimize recovery performance across a specific size distribution.

THE RELATED FAMILY

This application is also related to a family of nine PCT applications, which were all concurrently filed on 25 May 2012, as follows:

PCT application no. PCT/US12/39528, entitled "Flotation separation using lightweight synthetic bubbles and beads;"

PCT application no. PCT/US12/39524, entitled "Mineral separation using functionalized polymer membranes;"

PCT application no. PCT/US12/39540, entitled "Mineral separation using sized, weighted and magnetized beads;"

PCT application no. PCT/US12/39576, entitled "Synthetic bubbles/beads functionalized with molecules for attracting or attaching to mineral particles of interest," which corresponds to U.S. Pat. No. 9,352,335;

PCT application no. PCT/US12/39591, entitled "Method and system for releasing mineral from synthetic bubbles and beads;"

PCT application no. PCT/US/39596, entitled "Synthetic bubbles and beads having hydrophobic surface;"

PCT application no. PCT/US/39631, entitled "Mineral separation using functionalized filters and membranes," which corresponds to U.S. Pat. No. 9,302,270;"

PCT application no. PCT/US12/39655, entitled "Mineral recovery in tailings using functionalized polymers;" and PCT application no. PCT/US12/39658, entitled "Techniques for transporting synthetic beads or bubbles In a flotation cell or column," all of which are incorporated by reference in their entirety.

This application also related to PCT application no. PCT/US2013/042202, filed 22 May 2013, entitled "Charged engineered polymer beads/bubbles functionalized with molecules for attracting and attaching to mineral particles of interest for flotation separation," which claims the benefit of U.S. Provisional Patent Application No. 61/650,210, filed 22 May 2012, which is incorporated by reference herein in its entirety.

This application is also related to PCT/US2014/037823, filed 13 May 2014, entitled "Polymer surfaces having a siloxane functional group," which claims benefit to U.S. Provisional Patent Application No. 61/822,679, filed 13 May 2013, as well as U.S. patent application Ser. No. 14/118,984, filed 27 Jan. 2014, and is a continuation-in-part to PCT application no. PCT/US12/39631 (712-2.385//CCS-0092), filed 25 May 2012, which are all hereby incorporated by reference in their entirety.

This application also related to PCT application no. PCT/US13/28303, filed 28 Feb. 2013, entitled "Method and system for flotation separation in a magnetically controllable and steerable foam," which is also hereby incorporated by reference in its entirety.

This application also related to PCT application no. PCT/US16/57334, filed 17 Oct. 2016, entitled "Opportunities for recovery augmentation process as applied to molybdenum production," which is also hereby incorporated by reference in its entirety.

This application also related to PCT application no. PCT/US16/37322, filed 17 Oct. 2016, entitled "Mineral beneficiation utilizing engineered materials for mineral separation and coarse particle recovery," which is also hereby incorporated by reference in its entirety.

THE SCOPE OF THE INVENTION

It should be further appreciated that any of the features, characteristics, alternatives or modifications described regarding a particular embodiment herein may also be applied, used, or incorporated with any other embodiment described herein. In addition, it is contemplated that, while the embodiments described herein are useful for homogeneous flows, the embodiments described herein can also be used for dispersive flows having dispersive properties (e.g., stratified flow).

Although the invention has been described and illustrated with respect to exemplary embodiments thereof, the foregoing and various other additions and omissions may be made therein and thereto without departing from the spirit and scope of the present invention.

What is claimed is:

1. Apparatus having a flotation separation processor configured to receive ore having a mineral particle of interest and a barren media having a specific gravity, and provide a tailings slurry for further processing by either a first combination having a flotation cell, or a second combination with the flotation cell and a mixing tank, or a third combination with the flotation cell, the mixing tank and a contact cell scavenger, the tailings slurry having unwanted material together with loaded media having the barren media with the mineral particles attached thereto, the tailings slurry also having a corresponding specific gravity that is either greater or less than the specific gravity of the barren media, the apparatus comprising:
a separation and stripping stage configured to receive the tailings slurry, separate the loaded media from the unwanted material, combine the loaded media with a stripping agent to strip the mineral particles from the loaded media, and provide stripped barren media, the stripping agent and stripped mineral particles; and
a barren media, stripping agent and mineral particles recovery stage configured to receive the stripped barren media, the stripping agent and the stripped mineral particles, and provide cleaned barren media to either the flotation cell in the first combination, or the mixing tank in the second combination, when the specific gravity of the barren media is less than the corresponding specific gravity of the tailings slurry, or provide the cleaned barren media to the mixing tank in the third combination when the specific gravity of the barren media is greater than the corresponding specific gravity of the tailings slurry, wherein the apparatus comprises a wash water device configured to provide wash water into the contact cell scavenger cell in order to wash the loaded media contained therein.

2. Apparatus according to claim 1, wherein the barren media, stripping agent and mineral particles recovery stage is configured to provide the stripping agent and the stripped mineral particles for further processing.

3. Apparatus having a flotation separation processor configured to receive ore having a mineral particle of interest and a barren media having a specific gravity, and provide a tailings slurry for further processing by either a first combination having a flotation cell, or a second combination with the flotation cell and a mixing tank, or a third combination with the flotation cell, the mixing tank and a contact cell scavenger, the tailings slurry having unwanted material together with loaded media having the barren media with the mineral particles attached thereto, the tailings slurry also having a corresponding specific gravity that is either greater or less than the specific gravity of the barren media, the apparatus comprising:
a separation and stripping stage configured to receive the tailings slurry, separate the loaded media from the unwanted material, combine the loaded media with a stripping agent to strip the mineral particles from the loaded media, and provide stripped barren media, the stripping agent and stripped mineral particles; and
a barren media, stripping agent and mineral particles recovery stage configured to receive the stripped barren media, the stripping agent and the stripped mineral particles, and provide cleaned barren media to either the flotation cell in the first combination, or the mixing tank in the second combination, when the specific gravity of the barren media is less than the corresponding specific gravity of the tailings slurry, or provide the cleaned barren media to the mixing tank in the third combination when the specific gravity of the barren media is greater than the corresponding specific gravity of the tailings slurry,
wherein the separation and stripping stage comprises:
a first separation device having a first screen configured to receive the tailings slurry, separate the loaded media from the unwanted material, and provide the loaded media and the unwanted material;
a stripping device having a mixing tank configured to receive the loaded media and a stripping agent, mix and strip the mineral particles stripped from the loaded media, and provide stripped loaded media having the barren media with a remaining stripping agent contained therein and the mineral particles stripped from the loaded media; and
a second separation device having a second screen configured to receive the barren media having the remaining stripping agent contained therein and the mineral particles, separate the barren media from at least some of the remaining stripping agent, and provide the mineral particles, recovered stripping agent and the barren media for further processing.

4. Apparatus according to claim 3, wherein the barren media, stripping agent and mineral particles recovery stage comprises a vacuum filter having a conveyor belt, a mineral particles collection container and a stripping agent collection container; and
the vacuum filter having the conveyor belt is configured to receive and provide the mineral particles to the mineral particles collection container for further processing, and also to receive and provide the at least some of the remaining stripping agent to the stripping agent collection container for further processing.

5. Apparatus according to claim 3, wherein the apparatus further comprises a clean media tank configured to receive the barren media, and provide cleaned barren media for further processing.

6. Apparatus according to claim 5, wherein the apparatus further comprises a hydraulic pump configured to provide the cleaned barren media from the clean media tank to either the flotation cell in the first combination, or the mixing tank in the second combination, when the specific gravity of the barren media is less than the corresponding specific gravity of the tailings slurry, or provide the cleaned barren media to the mixing tank in the third combination when the specific gravity of the barren media is greater than the corresponding specific gravity of the tailings slurry.

7. Apparatus according to claim 4, wherein the apparatus further comprises a hydraulic pump configured to provide the recovered stripping agent from the stripping agent collection container to the mixing tank.

8. Apparatus according to claim 4, wherein the first separation device comprises a wash water device configured to wash the loaded media in order to separate the unwanted material from the loaded media.

9. Apparatus for processing a tailings slurry at the end of a flotation separation process, comprising:
   a tailings slurry processing device having either a first combination having a flotation cell, or a second combination with the flotation cell and a mixing tank, or a third combination with the flotation cell, the mixing tank and a contact cell scavenger, the tailings slurry provisioning device configured to receive an ore having a mineral particle of interest and a barren media having a specific gravity, and provide a tailings slurry having unwanted material and loaded media having the mineral particles of interest attached thereto, the tailings slurry having a corresponding specific gravity that is either greater or less than the specific gravity of the barren media;
   a separation and stripping stage configured to receive the tailings slurry, separate the loaded media from the unwanted material, combine the loaded media with a stripping agent to strip the mineral particles of interest from the loaded media, and provide stripped barren media, the stripping agent and the mineral particles of interest; and
   a barren media, stripping agent and mineral particles of interest recovery stage configured to receive the stripped barren media, the stripping agent and the mineral particles of interest, and provide cleaned barren media to either the flotation cell in the first combination, or the mixing tank in the second combination, when the specific gravity of the barren media is less than the corresponding specific gravity of the tailings slurry, or provide the cleaned barren media to the mixing tank in the third combination when the specific gravity of the barren media is greater than the corresponding specific gravity of the tailings slurry, wherein the apparatus comprises a wash water device configured to provide wash water into the contact cell scavenger cell in order to wash the loaded media contained therein.

* * * * *